US005649469A

United States Patent [19]
Pierce

[11] Patent Number: 5,649,469
[45] Date of Patent: Jul. 22, 1997

[54] STROKE INDICATOR FOR AN AIR-OPERATED COMBINATION DIAPHRAGM SPRING BRAKE

[75] Inventor: William C. Pierce, Muskegon, Mich.

[73] Assignee: NAI Anchorlok, Inc., Muskegon, Mich.

[21] Appl. No.: 57,988

[22] Filed: May 5, 1993

[51] Int. Cl.⁶ .................................................. F01B 25/26
[52] U.S. Cl. .................. 92/5 R; 92/63; 116/208; 116/285; 116/303; 188/1.11
[58] Field of Search .................. 92/5 R, 63, 62, 92/48, 130 A; 188/1.11; 91/43, 183, 185, 189 R, 525; 116/208, 285, 303, 281

[56] References Cited

U.S. PATENT DOCUMENTS

| | | |
|---|---|---|
| 1,861,853 | 6/1932 | Graham ................................... 116/285 |
| 2,914,630 | 11/1959 | Ralston . |
| 2,960,961 | 11/1960 | Seger ...................................... 116/303 |
| 3,298,466 | 1/1967 | Ayers et al. . |
| 3,359,869 | 12/1967 | Avrea . |
| 3,388,682 | 6/1968 | Whiting . |
| 3,399,601 | 9/1968 | Fuell et al. ................................ 91/189 |
| 3,431,031 | 3/1969 | Ike . |
| 3,736,842 | 6/1973 | Valentine . |
| 4,207,565 | 6/1980 | Isakson et al. . |
| 4,279,214 | 7/1981 | Thorn . |
| 4,583,071 | 4/1986 | Sebalos et al. . |
| 4,757,300 | 7/1988 | Sebalos . |
| 4,776,438 | 10/1988 | Schandelmeier . |
| 4,800,991 | 1/1989 | Miller . |
| 4,945,818 | 8/1990 | Ware . |
| 4,989,537 | 2/1991 | Hutchinson, Sr. et al. . |
| 4,991,310 | 2/1991 | Melia . |
| 5,002,164 | 3/1991 | Bowyer . |
| 5,044,302 | 9/1991 | Goldfein et al. . |
| 5,140,932 | 8/1992 | Goldfein et al. . |
| 5,141,295 | 8/1992 | Burgdorf et al. . |

FOREIGN PATENT DOCUMENTS

| | | | |
|---|---|---|---|
| 2835406 | 2/1980 | Germany ................................ 92/5 R |
| 2846652 | 5/1980 | Germany ................................ 92/5 R |
| 2901840 | 7/1980 | Germany ................................ 92/5 R |
| 624754 | 9/1961 | Italy ........................................ 116/281 |
| 889959 | 12/1991 | U.S.S.R. . |
| 1302928 | 1/1973 | United Kingdom . |
| 2021695 | 12/1979 | United Kingdom . |

*Primary Examiner*—Thomas E. Denion
*Attorney, Agent, or Firm*—Varnum, Riddering, Schmidt & Howlett LLP

[57] ABSTRACT

An air-operated combination diaphragm spring brake has a service chamber in tandem with a spring chamber. The service chamber being separated into an upper and lower section by a first elastomeric diaphragm. The spring chamber is separated into upper and lower sections by a second elastomeric diaphragm. A lever type stroke indicator is positioned within either or both the lower sections of the service chamber and the spring chamber.

The stroke indicator in the service chamber pivots about a pin when contacted by a plate associated with the service push rod when the brakes are applied, resulting in a portion of the stroke indicator to extend beyond the periphery of the service chamber housing and provide a visual indication of the need to inspect the brake system.

The stroke indicator in the lower section of the spring chamber also pivots about a pin when contacted by the pressure plate of the spring chamber resulting in a portion of the lever striking a pin which will then extend beyond the periphery of the service chamber housing, to provide a visual indication of the need to inspect the brake system. Simultaneously, another portion of the lever uncovers an opening to a passage between the lower section of the spring chamber and the atmosphere, which is sealed by a cap. The pressurized air within the lower section is great enough to blow away the cap to provide a second visual indication and the pressurized air exiting through the opening creates a high pitched whistle to provide an audible stroke indicator.

17 Claims, 3 Drawing Sheets

STROKE INDICATOR FOR AN AIR-OPERATED COMBINATION DIAPHRAGM SPRING BRAKE

BACKGROUND OF THE INVENTION

1. Field of the Invention

This invention relates to a stroke indicator in an air-operated combination diaphragm spring brake actuator of the type used with air brake systems on vehicles such as trucks. More specifically, the invention relates to a stroke indicator which signals a maximum limit of stroke attained by the actuator push rod.

2. State of the Prior Art

Spring-applying brake actuators are in common use with air brake systems used on trucks, buses, and towed vehicles. For normal braking operations, such actuators are typically provided with a service chamber, which apply and release the brakes in response to the operator directed delivery and exhaust of compressed air. For parking or emergency brake operation, such actuators are typically provided with a spring chamber disposed in tandem with the service chamber, which actuate the service chamber by exhausting air from the spring chamber.

In a typical air brake, the spring chamber and the service chamber are separated by a divider wall, in which is disposed a sealed annular opening. The seal typically comprises one or more O-rings positioned with grooves machined in the annular opening. The service brake chamber has a diaphragm that abuts a service push rod and separates the service push rod from the divider wall. Pressurized air is delivered or exhausted into the service chamber between the divider wall and the diaphragm to move the service push rod and apply or release the brakes.

The spring chamber has a diaphragm that abuts a spring plate. The spring plate separates the diaphragm from a power spring. An adapter push rod abuts the diaphragm and passes through the sealed opening of the divider wall. The O-rings of the sealed opening contact the exterior of the adapter push rod to prevent the transfer of air between the service chamber and the spring chamber.

Generally, a barrel-shaped power spring is used and provides the stored energy necessary to exert the large force required for emergency braking in the event of air pressure failure or as a parking brake. When the parking brake or emergency brake is not in use, pressurized air acting on the diaphragm compresses the spring to maintain it in its brake release position. When the air is exhausted from the spring chamber, the spring acts on the spring plate and diaphragm, which forces the adapter push rod into contact with the diaphragm of the service chamber and the service chamber push rod to apply the parking or emergency brakes.

As the vehicle's brakes are applied over time, the brake pads are worn away, resulting in an increase in the stroke of the service push rod needed to apply the necessary braking force. The stroke of the service push rod can also change if the brakes are out of adjustment. Thus, the length of travel of the service push rod is an indicator of brake wear or improper brake adjustment. The stroke of the service chamber push rod has long been used to indicate brake wear or improper adjustment because the service chamber push rod is easily visible, whereas the brake pads and brake assembly cannot easily be inspected because of the complexity and location of the brake pads and brake assemblies.

The prior art discloses many attempts to use the stroke of the service push rod to indicate brake wear and improper adjustment. Prior art stroke indicators include an electric switch disposed within or outside the brake housing and associated with the service push rod or service push rod plate to activate a signal on the vehicle dashboard when the brakes are worn past a predetermined level or out of adjustment. Examples of such electronic indicators are the U.S. Pat. No. 2,914,630 issued Nov. 24, 1959; U.S. Pat. No. 4,207,565, issued Jun. 10, 1980, U.S. Pat. No. 4,583,071, issued Apr. 15, 1986; U.S. Pat. No. 4,757,300, issued Jul. 12, 1988; and U.S. Pat. No. 4,800,991 issued Jan. 31, 1989.

The prior art also includes mechanical stroke indicators. U.S. Pat. No. 4,279,214, issued Jul. 21, 1981 and U.S. Pat. No. 4,989,537 issued Feb. 5, 1991 disclose a mechanical stroke indicator comprising a sleeve which surrounds the push rod and which is urged outwardly from the brake housing by the push rod plate when the brake is applied. The sleeve can have indicia that indicate the amount of stroke. A metal extension associated with the push rod plate and passing through the service brake housing is used as a stroke indicator in U.S. Pat. No. 3,298,466, issued Jan. 17, 1967. The amount of the plate that extends beyond the brake housing indicates the amount of stroke. U.S. Pat. No. 4,991,310, issued Feb. 12, 1991; U.S. Pat. No. 5,044,302, issued Sep. 3, 1991; and U.S. Pat. No. 5,140,932, issued Aug. 25, 1992 disclose rulers having indicia and extending from the brake housing, parallel to the push rod are used in combination with a pointer mounted on the push rod to indicate the stroke.

Indicia associated with the service brake push rod have also been used as stroke indicators. The U.S. Pat. No. 4,945,818, issued Aug. 7, 1990, disclosed indicia etched or cut into the surface of the service brake push rod. If the indicia were visible after setting the parking brake, the brake pads were sufficiently worn or improperly adjusted to warrant inspecting the brakes. Adhesive labels having indicia have also been applied to the push rod to indicate the amount of stroke.

SUMMARY OF THE INVENTION

In accordance with the invention, a fluid operated brake actuator comprises a housing defining a chamber in which is mounted a member for reciprocal movement along a path of travel. The member is operably connected to a brake to apply and release the brake in response to the delivery and exhaust of a fluid, such as air, respectively, to the chamber. The housing further has an indicating means, which indicates a predetermined length of travel for the member along the path when the brake is actuated.

The indicating means comprises a lever that is pivotally mounted to the housing and moves between a neutral position and an indicating position. The lever further has an arm which extends inwardly into the chamber to a point in the path of travel of the member. The lever is positioned so that the member will contact the arm of the lever as the member reaches the predetermined length of travel.

The lever further has an indicator which extends from the lever and is received within an aperture in the housing. The indicator has resisting means to resist the free movement of the indicator within the aperture. When the member exceeds the predetermined length of travel, the arm of the lever will be pushed by the member, the lever will pivot and the indicator will move within the aperture to protrude and remain protruded from the housing in a position which is visible to an observer.

Preferably, the indicator is a shoulder which is integral with the lever. In one aspect, the aperture is a slot having a width sized to frictionally restrain the shoulder to resist free movement of the indicator within the aperture. In another aspect, the lever is mounted to the wall by a pin and the movement of the lever and shoulder is frictionally restrained by the pin. The shoulder is preferably shaped to conform to the contour of the outer surface of the housing so as not to protrude from the housing when the lever is in the neutral position.

Further, a spring can be disposed between the housing and the lever to bias the lever to the neutral position.

In one embodiment, the lever has a shoulder and a wall of the housing has an aperture extending from the chamber to the exterior of the housing. The shoulder of the lever is positioned to seal the aperture from the chamber when the lever is in the neutral position. When the member exceeds the predetermined length along the path of travel, the member will contact the arm of the lever and the lever will pivot away from the neutral position, thereby moving the seal away from the aperture so that pressurized fluid will escape through the aperture.

Preferably, the aperture is configured so that the escaping pressurized fluid will generate an audible signal. The lever is maintained in the neutral position by a spring which biases the lever to the neutral position.

The fluid operated brake actuator can further comprise a cap that seals the aperture exterior to the housing with a force less than the force of the pressurized air so that the cap will be propelled away from the housing when the pressurized air in the chamber is exhausted through the aperture.

The invention provides a simple and reliable stroke indicator which is easy to use. The invention further provides a mechanical stroke indicator having both visual and audible warnings.

BRIEF DESCRIPTION OF THE DRAWINGS

The invention will now be described with reference to the accompanying drawings in which.

DETAILED DESCRIPTION OF THE DRAWINGS

Figure 1:
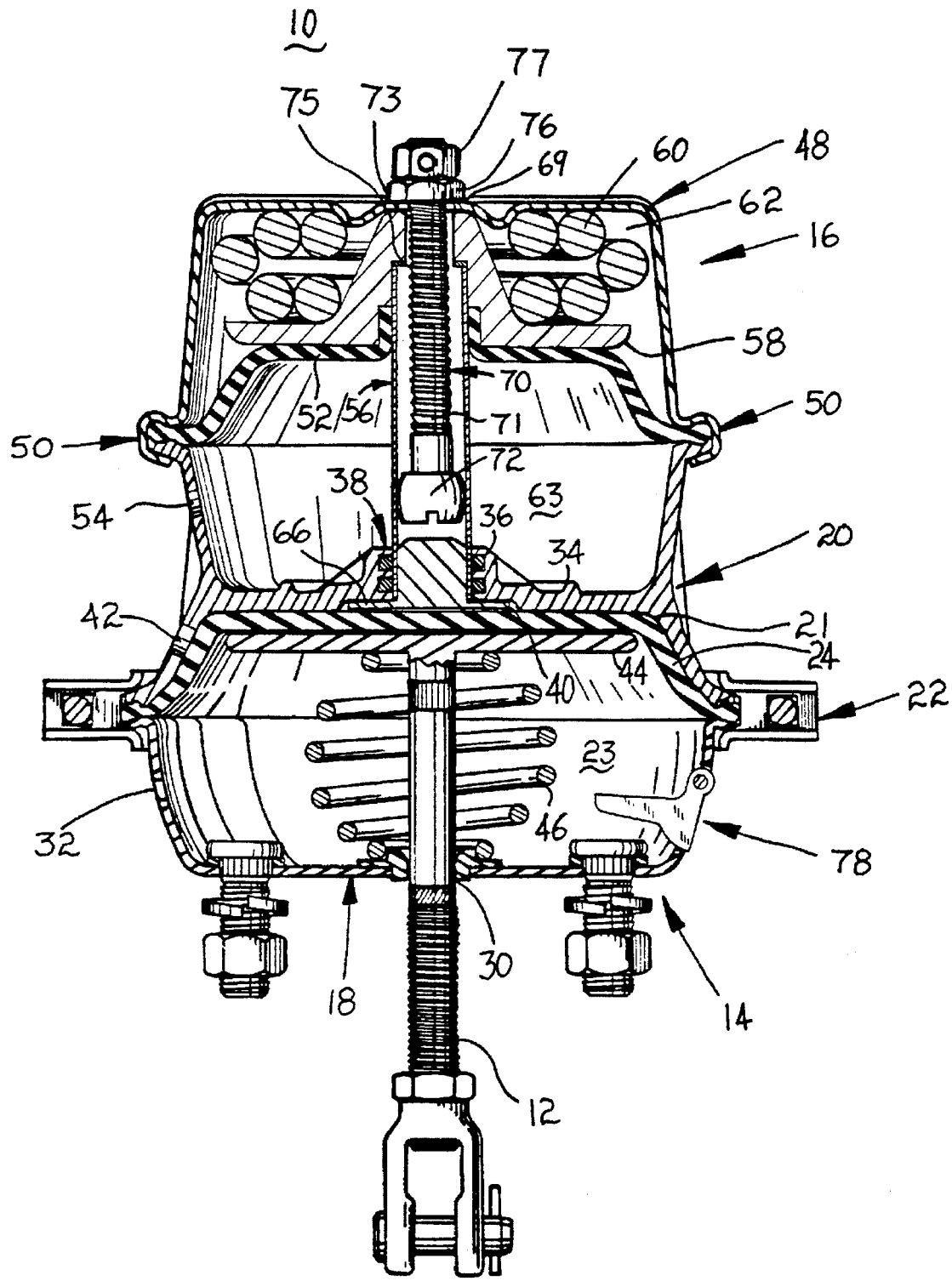
FIG. 1 is a cross-sectional view of an air-operated combination diaphragm spring brake with a stroke indicator according to the invention.

FIG. 1 illustrates a fluid-operated brake actuator 10 in accordance with the invention. The particular embodiment shown is an air-operated combination diaphragm spring brake actuator. The brake actuator is adapted to mount to a vehicle frame (not shown) and is further adapted to operate a brake (not shown) through a service push rod 12, which typically extends to and connects with a slack adjuster and the braking system of the vehicle (not shown).

The air-operated combination diaphragm spring brake comprises a service chamber 14 and a spring chamber 16 joined together in tandem. The service chamber 14 is defined by a cup-shaped service housing 18 and a double cup-shaped adapter housing 20 joined together by a clamp 22 to form a hollow interior chamber. The adapter housing 20 is also known as a flange case.

A first elastomeric diaphragm 24 (also known as the service brake diaphragm) is clamped in fluid tight engagement between the cup-shaped service housing 18 and the service side of the adapter housing 20, separating the service chamber into an upper service chamber section 21 and a lower service chamber section 23. Openings 26 are provided in the cup-shaped service housing 18 for bolts 28, which bolt the cup-shaped service housing 18 to the vehicle. A central opening 30 is provided in the cup-shaped service housing 18 and through which passes the service push rod 12. One or more vent openings 32 are also provided in the cup-shaped service housing 18 for opening the lower service chamber section 23 to the atmosphere.

The adapter housing 20 forms a divider wall 34 and has an opening 38 sealed by O-rings 36. An indentation or annular depression 40 is formed around the sealed opening 38. An aperture 42 is provided in the adapter housing 20 for providing communication between a source of pressurized air (not shown) and the upper service chamber section 21 of the service chamber to permit air to act upon the diaphragm in a manner to be described.

The service push rod 12 is mounted within the service chamber 14 and reciprocates within the central opening 30. A service push rod plate 44 is mounted to the terminal end of the service push rod 12. A service return spring 46 extends between a central portion of the cup-shaped service housing 18 and the service push rod plate 44 to bias the service push rod plate 44 and, thus, the service push rod 12 inwardly of the service chamber 14 to release the brake when the air in the upper service chamber section 21 is exhausted. The spring biased service push rod plate 44 forces the first elastomeric diaphragm 24 against the divider wall 34 on the service side of adapter housing 20 in the brake release position.

The spring chamber 16 is defined by the spring side of the adapter housing 20 and a generally cylindrical head 48 or spring housing, which is clamped to the spring side of the adapter housing 20 through a clamping mechanism 50. A second elastomeric diaphragm 52, known as the spring diaphragm, is clamped in fluid tight engagement between the spring side of adapter housing 20 and the head 48 by the clamping mechanism 50. The spring diaphragm 52 separates the spring chamber into an upper spring chamber section 62 and a lower spring chamber section 63. Typically, the adapter housing 20 is formed of cast aluminum and the actuator head 48 is formed of stamped or spun low-carbon steel, although the adapter housing 20 can also be formed of steel.

An aperture 54 is provided within the spring side of the adapter housing 20 to connect the lower section 63 of the spring chamber 16 with a source of pressurized air (not shown). An adapter push rod 56 is mounted to a pressure plate 58, which abuts the second elastomeric diaphragm 52. A power spring 60 is disposed between the head 48 and the pressure plate 58. Preferably, the terminal end of the adapter push rod passes through the second elastomeric diaphragm 52 and is press-fitted to the pressure plate 58, which also pinches the second elastomeric diaphragm 52 between the adapter push rod 56 and the pressure plate 58 to divide the spring chamber into two sections.

The adapter push rod 56 is shown in the drawings as being hollow, but can be solid. The distal end of the adapter push rod 56 is mounted to a reaction plate 66. The reaction plate 66 seats within the annular depression 40 of the divider wall 34.

The terminal end of the adapter push rod 56 receives a caging tool 70, which passes through aligned apertures 69, 73, and 75 in the head 48, pressure plate 58 and adapter push rod 56, respectively. The caging tool has a threaded elongated shaft 71 with one end having an enlarged head portion 72. The other end is threaded into a head nut 76 fixedly mounted to the head 48. A caging tool nut 77 locks the position of the caging tool with respect to the head 48.

In operation, air pressure is continually supplied to the lower section 63 of spring chamber 16 through the aperture 54 to maintain the spring diaphragm 52 in a position to compress the power spring 60. When air pressure is supplied through the aperture 42 as, for example, when the brakes are applied by a vehicle operator, air pressure is introduced between the first elastomeric diaphragm 24 and the divider wall 34, thereby forcing the first elastomeric diaphragm 24 away from the divider wall 34. In this manner, the service push rod 12 is extended outwardly of the service chamber 14 to apply braking pressure to the vehicle brakes in a conventional fashion. Conversely, release of air pressure between the first elastomeric diaphragm 24 and the divider wall 34 enables the service return spring 46 to urge the service push rod 12 to move toward the divider wall 34, thereby retracting the service push rod 12 and releasing the brake.

However, in the event of a loss of pressure, either intentionally, as when the parking brake is set, or by failure of the air pressure system, the pressure in the lower section 63 of the spring chamber 16 will be decreased so that the service return spring 46 will no longer be able to overcome the pressure of the much larger and stronger power spring 60. Thus, the pressure plate 58 forces the spring diaphragm 52, and thus the adapter push rod 56 outwardly, thereby forcing the service push rod 12 outwardly to apply braking pressure to the brakes.

Figure 3:
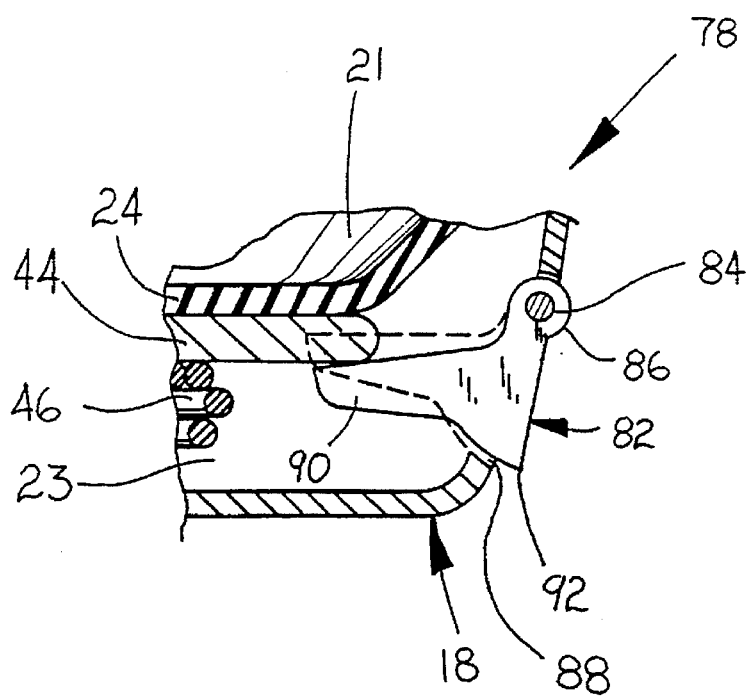
FIG. 3 is an enlarged fragmentary view of the stroke indicator of FIG. 1 in an indicating position.

A stroke indicator 78 is especially adapted for an unpressurized chamber such as the lower service chamber section 23 of the service chamber. FIG. 3 more clearly illustrates the stroke indicator 78 according to the invention. The stroke indicator 78 comprises a lever 82, which is pivotally mounted to the service chamber 14 within a slot 88 in a wall of the cup-shaped service housing 18. Preferably, the lever is pivotally mounted to the cup-shaped service housing 18 by a mounting pin 84 that passes through a lever aperture 86 of the lever 82. The mounting pin 84 is received within the cup-shaped service housing 18 on opposite sides of the slot 88.

The lever 82 has an arm 90 and a shoulder 92, which is preferably shaped to conform to the outer contour of the cup-shaped service housing 18 when the lever 82 is in a neutral position. The shoulder 92 of lever 82 can be frictionally retained within the slot 88 to inhibit accidental movement of the lever 82. Alternatively, frictional resistance can be provided at the pivot. The lever 82 rotates between two positions, a neutral position and an indicating position. In the neutral position, as indicated by the phantom lines, the shoulder 92 of the lever 82 lies within the slot 88 and conforms with the exterior surface of the cup-shaped service housing 18. The arm 90 extends inwardly to a point in the line or path of travel of the service push rod plate 44. In the indicating position, the shoulder will extend beyond the outer surface of the cup-shaped service housing 18 and provide a visual indicator to an observer that brake wear or brake adjustment should be inspected.

The stroke of the fluid-operated brake actuator 10 is defined by application of the service brake or the spring brake as described above. In either case, the service push rod plate 44 will move, along with the service push rod 12, in a direction away from the adapter housing 20. The arm 90 is in the path of travel of the service push rod plate 44, but is positioned so that during normal operation when the brakes are not excessively worn or otherwise out of adjustment, the service push rod plate 44 will not reach the arm 90 at the end or limit of stroke. On the other hand, if the stroke is great enough, i.e., when the stroke of the service push rod 12 exceeds a predetermined maximum length, the service push rod plate 44 will contact the arm 90 of the lever 82. The force of the service push rod plate 44 as it moves is sufficient to overcome the frictional resistance of the lever 82 so that the lever 82 rotates away from the neutral position, and the shoulder 92 will protrude beyond the outer surface of the cup-shaped service housing 18, thus providing a visual indication of the need to inspect the brakes for wear or improper adjustment. The lever will remain in the indicating position when the brakes are released because of the frictional resistance of the lever 82.

Typically, the outer surface of the cup-shaped service housing 18 will be dirty from road debris so that the protrusion of the clean metal shoulder 92 beyond the outer surface of the cup-shaped service housing 18 will be easily noticed by an observer. Alternatively, the shoulder 92 or entire lever 82 can be brightly colored so it can be easily observed.

Figure 2:
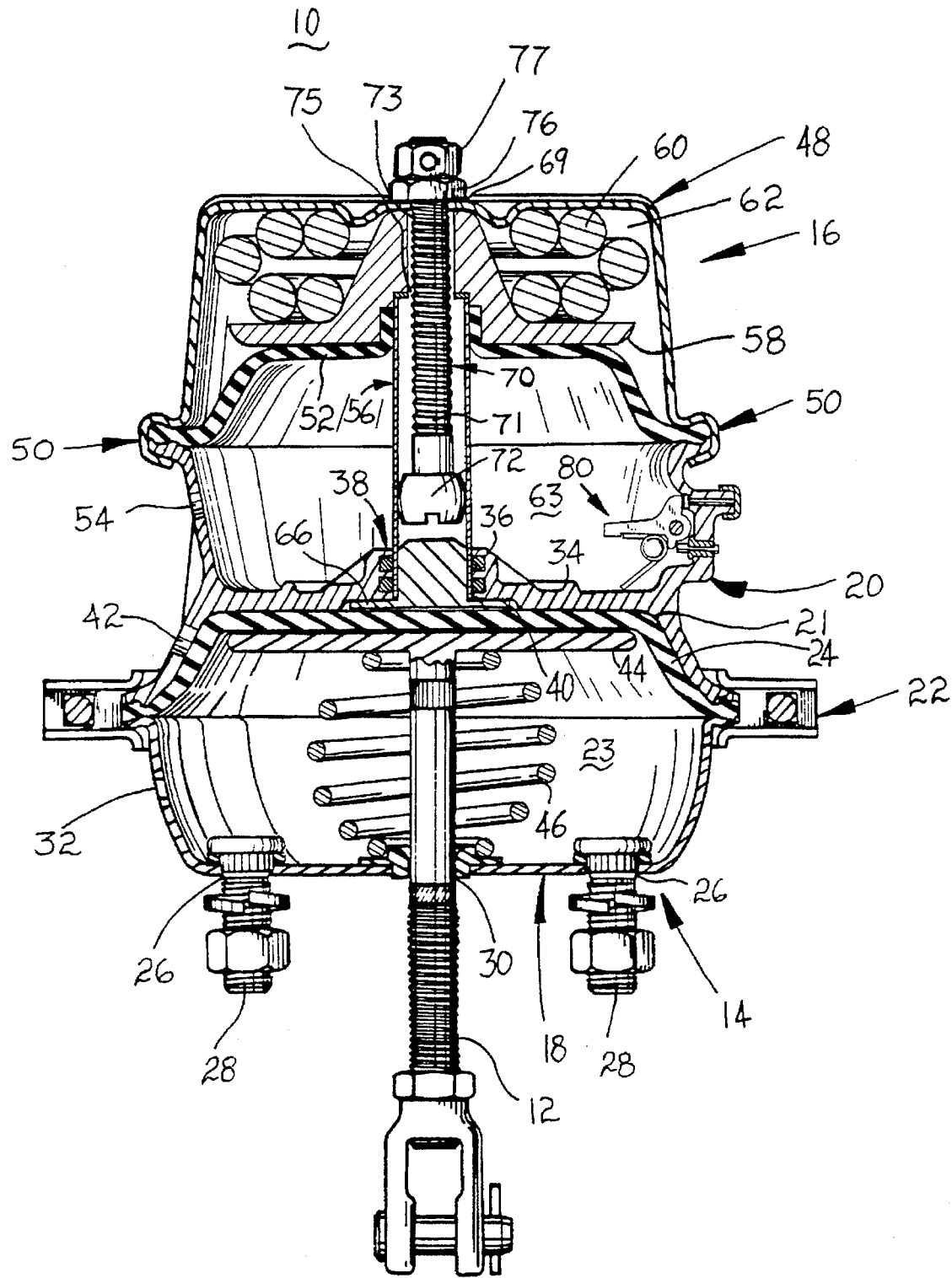
FIG. 2 is a cross-sectional view of an air-operated combination diaphragm spring brake with a second embodiment of a stroke indicator according to the invention.
Figure 4:
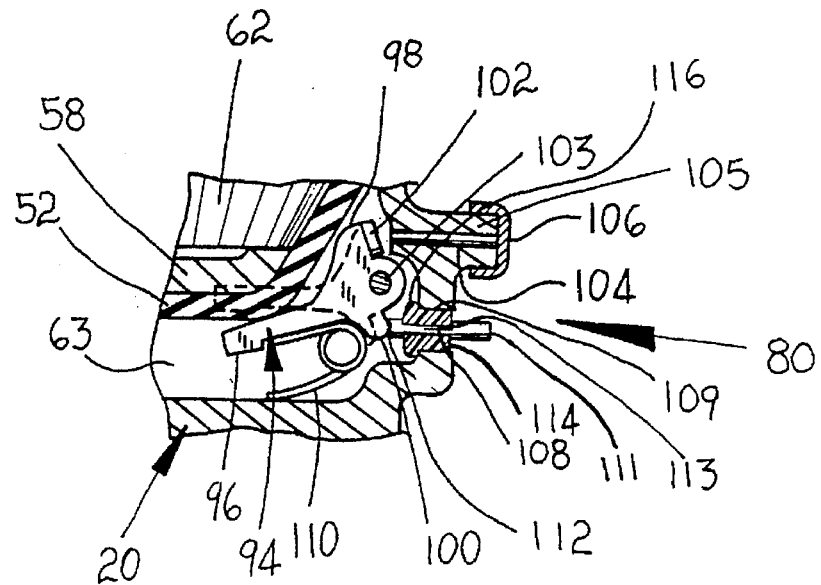
FIG. 4 is an enlarged fragmentary view of the second embodiment of the stroke indicator according to the invention in an indicating position.

FIG. 2 and 4 illustrate the second embodiment of the stroke indicator according to the invention. The stroke indicator 80 is adapted for a pressurized chamber such as the second portion of the spring chamber. The second stroke indicator 80 comprises a lever 94 having an arm 96 from which extend two shoulders 98 and 100. The first shoulder 98 has a flat portion to which is mounted an elastomeric plug 102. The lever 94 is pivotally mounted by a pin 103 within the lower section spring chamber 63. The adapter housing 20 has a first aperture 104 to enable communication between the lower section spring chamber 63 and the atmosphere. A nipple 105 on the exterior of the adapter housing 20 and around the first aperture 104 receives a cap 106 which is frictionally held on the nipple. A second aperture 109 in the adapter housing 20 is spaced not far from the first aperture 104. The second aperture 109 slidably receives a rod 108. The rod 108 has a reduced diameter portion or groove 113 in which is placed an elastomeric sealing material 114, such as an O-ring, with a head portion 116. The elastomeric sealing material 114 is disposed within the aperture 109, and the head 116 of the elastomeric sealing material 114 abuts the inner surface of the adapter housing 20. The elastomeric sealing material 114 and rod 108 seal the second aperture 109. The coefficient of friction between the rod 108 and the elastomeric sealing material 114 is great enough to resist the force exerted on the rod 108 by pressurized air in the lower section 63 of spring chamber 16 to prevent the movement of the rod 108 in the second aperture 109. The rod 108 is longer than the second aperture and is normally disposed in the second aperture 109 so that the outer end 111 will be flush with the outer surface of the adapter housing 20 when the brake is operating normally and not out of adjustment (see FIG. 2).

The lever 91 is mounted to rotate between two positions, a neutral position and an indicating position. In the neutral position, as indicated by the phantom lines, the lever 94 is positioned so that the elastomeric plug 102 of shoulder 98 seals the first aperture 104 from the lower section spring chamber 63. The lever 94 is also positioned so that the second shoulder 100 is adjacent to the inner end 112 of the rod 108. The lever 94 is preferably biased toward the neutral position by means, such as a spring 110. However, the spring 110 is not necessary for the indicator to function properly.

The stroke indicator 80 operates in a manner not unlike the stroke indicator 78. As the spring brake is set, the power spring 60 causes the pressure plate 58 and the spring diaphragm 52 to move toward the adapter housing 20. The arm 96 extends inwardly of the chamber to be in the path or line of travel of the pressure plate 58 and spring diaphragm 52. However, it is positioned so that when the spring brake is actuated, but not out of adjustment, the pressure plate 58 and spring diaphragm 52 will not reach the arm 96. On the other hand, when the stroke exceeds a predetermined maximum length, the spring diaphragm 52, pushed by the pressure plate 58, will contact the arm 96. The force exerted by the power spring 60 on the pressure plate 58 and spring diaphragm 52 is sufficient to overcome the force of the spring 110, causing the lever 94 to be pivoted away from the neutral position toward the indicating position. As it does so, the second shoulder 100 urges the rod 108 outward within the second aperture 109 so that the outer end 111 protrudes from the outer surface of the adapter housing 20. Simultaneously, the first shoulder 98 and elastomeric plug 102 are withdrawn from the first aperture 104. Residual air pressure within the lower section 63 of the spring chamber 16 is great enough to propel the cap 106 off the nipple 105. As the pressurized air escapes through the first aperture 104, it generates an audible sound. Thus, the protruding outer end 111 of the rod 108 provides a visual indicator that the stroke has exceeded a predetermined length, and the open aperture provides an audible indicator. Further, the absence of the cap 106 from the nipple 105 will provide a second visual indicator. The rod 108 and nipple 105 can be brightly colored to render them more visible when exposed. In this manner, the observer has both a visual and audible indication of possible brake wear or improper adjustment.

Reasonable variation and modification are possible within the scope of the foregoing disclosure without departing from the spirit of the invention which is defined in the accompanying claims. For example, whereas the invention has been described with reference to the stroke indicator 80 as positioned in the pressurized spring chamber, it can also be used in the unpressurized service chamber. It is also within the scope of the invention to provide both embodiments of the invention in a single brake actuator. Additionally, either lever mechanism can be made as a separate sub-assembly and inserted into the appropriate housing.

The embodiments for which an exclusive property or privilege is claimed are defined as follows:

1. In a fluid-operated brake actuator comprising a housing defining a chamber, a member mounted within the chamber for reciprocal movement along a path of travel, said member being operably connected to a brake for actuation and release thereof in response to the delivery and exhaust of fluid, respectively, to the chamber, and means for indicating a predetermined length of travel of the member along the path upon actuation of the brake, the improvement in the indicating means comprising:
 a lever pivotably mounted to the housing for movement between a neutral position and an indicating position, said lever having an arm extending inwardly of the chamber to a point in the path of travel of the member, wherein said lever is so positioned that the member will contact the arm as the predetermined length of travel is reached;
 said housing having an aperture open to the exterior of the housing;
 an indicator extending from the lever and movably received in the aperture; and
 resisting means to resist free movement of the indicator within the aperture;
 whereby when the member exceeds the predetermined length, the lever will pivot and the indicator will move within the aperture to protrude and remain protruded from the housing in a position to be visible, exterior of the housing.

2. A fluid-operated brake actuator according to claim 1 wherein the indicator is a shoulder on the lever.

3. A fluid-operated brake actuator according to claim 2 wherein the aperture is a slot, and the resisting means comprises a frictional fit between the slot and the shoulder.

4. A fluid-operated brake actuator according to claim 3 wherein the shoulder is shaped to generally conform to the contour of the outer surface of the housing when the lever is in the neutral position.

5. A fluid-operated brake actuator according to claim 4 further comprising a spring between the housing and the lever to bias the lever to the neutral position.

6. A fluid-operated brake actuator according to claim 2 wherein the lever is mounted to a pin and the resisting means comprises frictional resistance between the lever and the pin.

7. A fluid-operated brake actuator according to claim 6 wherein the shoulder is shaped to generally conform to the contour of the outer surface of the housing when the lever is in the neutral position.

8. A fluid-operated brake actuator according to claim 1 wherein the indicator is an elongated rod slidably received in the aperture and the resisting means comprises the aperture which is sized to frictionally resist slidable movement of the rod therein.

9. A fluid-operated brake actuator according to claim 8 wherein the lever further comprises a shoulder which contacts the rod to move the rod within the aperture when the lever is moved to the indicating position.

10. A fluid-operated brake actuator according to claim 9 wherein the rod is longer than the aperture and positioned therein so that the outer end of the rod does not protrude from the housing when the lever is in the neutral position.

11. A fluid-operated brake actuator according to claim 10 and further comprising a spring between the housing and the lever to bias the lever to the neutral position.

12. In a fluid-operated brake actuator comprising a housing defining a chamber having an exterior wall, a member mounted within the chamber for reciprocal movement along a path of travel, said member being operably connected to a brake for actuation and release thereof in response to the delivery and exhaust of pressurized fluid, respectively, to the chamber, and means for indicating a predetermined length of travel of the member along the path upon actuation of the brake, the improvement in the indicating means comprising:
 a lever pivotably mounted to the housing within the chamber for movement between a neutral position and an indicating position, said lever having an arm extending inwardly of the housing to a point in the path of travel, wherein said lever is so positioned that the member will contact the arm as the predetermined length of travel is reached;
 said wall having an aperture extending from the chamber to the exterior of the housing; and
 a shoulder on said lever in a position to seal the aperture from the chamber when the lever is in the neutral position,
 whereby when the member exceeds the predetermined limit, the lever will pivot away from the neutral position thereby moving the seal away from the aperture so that pressurized fluid will escape through the aperture.

13. A fluid-operated brake actuator according to claim 2 wherein the aperture is configured so that escaping pressurized fluid will generate an audible signal.

14. A fluid-operated stroke indicator according to claim 13 and further comprising a spring between the housing and the lever to bias the lever to the neutral position.

15. A fluid-operated brake actuator according to claim 12 wherein a cap seals the aperture exterior to the housing with a force less than the force of the pressurized air, whereby the cap is propelled away from the housing when the pressurized air in the chamber is exhausted through the aperture.

16. A fluid-operated brake actuator according to claim 15 wherein the aperture is configured so that escaping pressurized fluid will generate an audible signal.

17. A fluid-operated brake actuator according to claim 15 further comprising a spring between the housing and the lever to bias the lever to the neutral position.

* * * * *